United States Patent
Bailey

(10) Patent No.: US 6,191,549 B1
(45) Date of Patent: Feb. 20, 2001

(54) APPARATUS AND METHOD FOR PRODUCING HIGH FIDELITY OUTPUT WITH A LIMITED RESOLUTION OUTPUT DEVICE

(75) Inventor: David Arthur Bailey, Glendale, AZ (US)

(73) Assignee: Honeywell International Inc., Morristown, NJ (US)

(*) Notice: Under 35 U.S.C. 154(b), the term of this patent shall be extended for 0 days.

(21) Appl. No.: 09/366,490

(22) Filed: Aug. 3, 1999

(51) Int. Cl.$^7$ ........................................ G01P 3/00
(52) U.S. Cl. .............................. 318/652; 318/685
(58) Field of Search .......................... 318/475, 605, 318/652, 653, 661, 685, 696; 324/160

(56) References Cited

U.S. PATENT DOCUMENTS 4,320,390 * 3/1982 Scott .
4,654,634 * 3/1987 Thong et al. .
5,608,399 * 3/1997 Coleman, Jr. ........................ 341/139
5,847,475 * 12/1998 Rauch et al. ....................... 310/49 R

* cited by examiner

*Primary Examiner*—Bentsu Ro
(74) *Attorney, Agent, or Firm*—Robert E. Greenstien

(57) ABSTRACT

A circuit for use with a limited resolution device such as a stepper motor to convert a high-resolution signal such as from a computer into a high fidelity signal for driving the limited resolution device. The input to the limited resolution device being an average of the integrated difference between the high-resolution signal and a limited resolution signal consistent with the values used for driving the limited resolution device. This average being a high fidelity signal which is substantially the same as the high-resolution signal.

10 Claims, 1 Drawing Sheet

APPARATUS AND METHOD FOR PRODUCING HIGH FIDELITY OUTPUT WITH A LIMITED RESOLUTION OUTPUT DEVICE

BACKGROUND OF THE INVENTION

1. Field of the Invention

The present invention is in the field of signal conversion and relates to generating low-resolution signals that match high-resolution curves with much greater precision than has been heretofore obtained. More particularly, the present invention produces a high fidelity output for use with a low-resolution output device and its associated components so that the output device and its components follow the high resolution curve more accurately.

2. Description of the Prior Art

In the prior art, when it is desired to drive an output device such as a stepper motor or a digital to analog converter, which has only limited resolution, from a digital source such as a computer which has much greater resolution, it as been the practice to convert the high resolution input signal to the limited resolution of the output device and use the result to drive the output device. When, however, the variation in the signal is of the same order of magnitude as the resolution of the output device, and error may result. For example, the output of a computer is typically $2^{16}$ or $2^{32}$ counts whereas the resolution of a stepper motor is more in the range of $2^8$ counts. Taking a signal containing e.g., 65536 counts and reducing it to a signal containing 256 counts produces a drive signal that may not always follow the desired control signal, because of the truncation of the less significant bits of the signal. In FIG. 1 a sine curve, 10, which may be digitally generated by a computer is shown to be relatively high resolution consisting of a large number of very small steps. The conversion of the signal 10 to a low-resolution signal for use in driving and output device such as a stepper motor is shown by curve 12 and it is seen that the only times that the low-resolution signal 12 is accurate is at those points where the two curves cross such as 14, 16 and 18. At all other points the low-resolution curve is not accurate. The inaccuracy is worst at points such as 22, 24 and 26 where the low-resolution curve 12 is furthest away from the desired curve 10.

BRIEF DESCRIPTION OF THE INVENTION

The present invention uses an unstable control loop that results in the low-resolution signal being modulated within the resolution of the output device. A fast position follower is generated with a discontinuity in the form of a reduced resolution block. The non-linearity of the resolution block combined with an integrator results in an oscillation that is used as a modulation signal. High bandwidth and good accuracy are obtained.

DETAILED DESCRIPTION OF THE PREFERRED EMBODIMENTS

Figure 2:
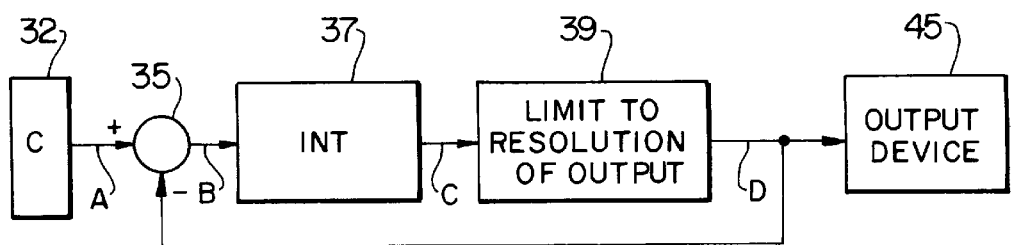
FIG. 2 is a block diagram of the present invention.

Referring to FIG. 2, a computer 32 generates a high-resolution signal on a line A connected to the plus input of a subtraction circuit 35. The output of the subtraction circuit 35 on a line B is presented to a summer 37, which acts as an integrator, and the output of the summer 37 on a line C is presented to a "limit to resolution of output" circuit 39, which may be a comparator, and which produces an output on line D at a level consistent with the proper level of the output device. Output line D is fed back over a line 42 to the subtraction circuit 35 as the negative input thereto. The output line D also provides the input signal for the output device 45. In the preferred embodiment, the components 32, 35, 37, and 39 are representative of software operations used to carry out the operation of the invention, but the operations could be performed with hardware components also. After each calculation the value at D may or may not change.

Figure 3:
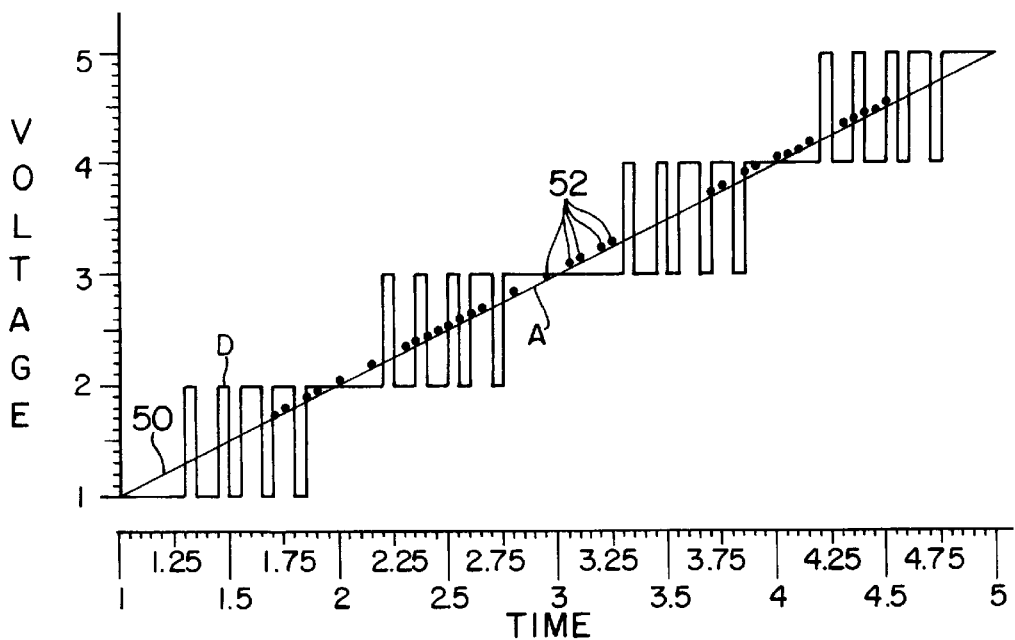
FIG. 3 is a graph of a high-resolution curve similar to FIG. 1 but in the form of a straight-line ramp and showing how the present invention is used.

As will be seen in connection with FIG. 3, the high resolution signal at point A in FIG. 2, is converted to a lower resolution signal that is modulated to generate an average signal equal to the desired input signal. At each step in the calculation cycle, the difference between the high resolution input signal on line C and the limited resolution output signal on line D, is taken and summed in summer 37 to all the previous errors. The high-resolution summer is then converted to the same resolution as the output in the "limit to resolution of output" box 45. The summer acts as an integrator to generate an integral error between the output and the input. Since there is an integration, the average output equals the input.

The low-resolution output can go directly to a low resolution A/D converter, or it can be differentiated to generate the step commands for a stepper motor. If this is used with a stepper motor, the average position of the stepper motor will be equal to the average input of the input signal.

Figure 1:
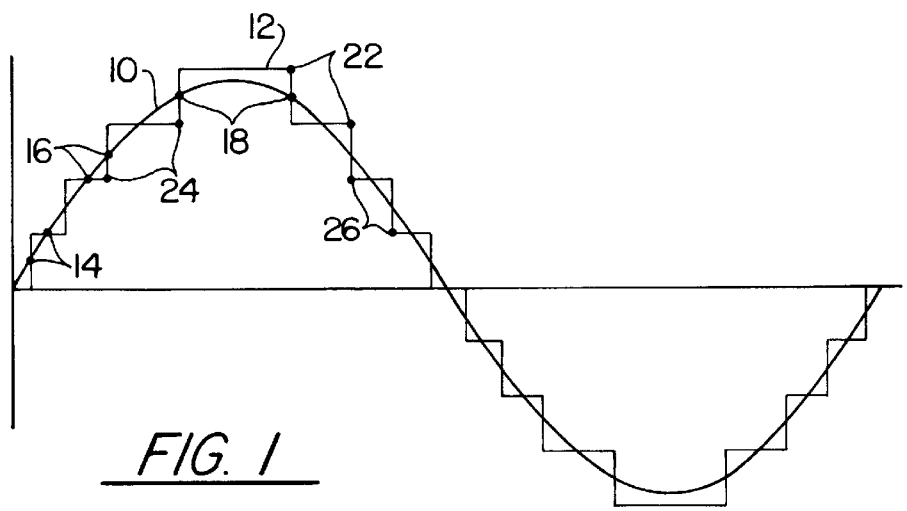
FIG. 1 is a graph showing the prior art fitting of a low-resolution curve to a high-resolution curve.

For convenience in the following explanation, assume that the output device 45 is a stepper motor with its associated apparatus such as gearing and linkages, etc. and that it takes a change of 1 volt to move the stepper motor to the next or previous level. For simplicity, assume the stepper motor has steps of 1, 2, 3, 4, and 5, that it is presently at level 1 and that it takes an input of 1.5 volts to move it to level 2, an input of 2.5 volts to move it to level 3 etc. Although the example of FIG. 1 is shown as a sine wave 10, it will be easier for purposes of this explanation to assume that the output from computer 32 on line A is a high resolution straight line ramp 50, as seen in FIG. 3, which starts at 1.0 volts and moves upward in steps of 0.05 volts. Finally, for convenience, assume that, at the moment, the output of stepper 37 is 0.6 volts (the actual output of stepper 37 depends on the history of its inputs as will be seen hereinafter). The "limit to resolution of output" box thus determines that a voltage of 0.6 will put the output device 45 at a level 1 for the stepper motor. The following chart shows the voltages on lines A, B, C and D as the ramp output from computer 32 increases by 0.05-volt increments. Also shown is a post analysis of the average value (shown as voltages such as reference numeral 52) of the voltage at D when 20 increments are averaged (10 increments prior to each value and 9 increments after each value). Other numbers of increments could also be used.

| A Voltage | B Voltage | C Voltage | D Voltage | Avg D Voltage |
|---|---|---|---|---|
| 1 | 0 | 0.6 | 1 | |
| 1.05 | 0.05 | 0.65 | 1 | |

-continued

| A Voltage | B Voltage | C Voltage | D Voltage | Avg D Voltage |
|---|---|---|---|---|
| 1.1 | 0.1 | 0.75 | 1 | |
| 1.15 | 0.15 | 0.9 | 1 | |
| 1.2 | 0.2 | 1.1 | 1 | |
| 1.25 | 0.25 | 1.35 | 1 | |
| 1.3 | 0.3 | 1.65 | 2 | |
| 1.35 | −0.65 | 1 | 1 | |
| 1.4 | 0.4 | 1.4 | 1 | |
| 1.45 | 0.45 | 1.85 | 2 | 1.45 |
| 1.5 | −0.5 | 1.35 | 1 | 1.5 |
| 1.55 | 0.55 | 1.9 | 2 | 1.55 |
| 1.6 | −0.4 | 1.5 | 2 | 1.6 |
| 1.65 | −0.35 | 1.15 | 1 | 1.65 |
| 1.7 | 0.7 | 1.85 | 2 | 1.75 |
| 1.75 | −0.25 | 1.6 | 2 | 1.8 |
| 1.8 | −0.2 | 1.4 | 1 | 1.8 |
| 1.85 | 0.85 | 2.25 | 2 | 1.9 |
| 1.9 | −0.1 | 2.15 | 2 | 1.95 |
| 1.95 | −0.05 | 2.1 | 2 | 1.95 |
| 2 | 0 | 2.1 | 2 | 2.05 |
| 2.05 | 0.05 | 2.15 | 2 | 2.05 |
| 2.1 | 0.1 | 2.25 | 2 | 2.1 |
| 2.15 | 0.15 | 2.4 | 2 | 2.2 |
| 2.2 | 0.2 | 2.6 | 3 | 2.2 |
| 2.25 | −0.75 | 1.85 | 2 | 2.25 |
| 2.3 | 0.3 | 2.15 | 2 | 2.35 |
| 2.35 | 0.35 | 2.5 | 3 | 2.4 |
| 2.4 | −0.6 | 1.9 | 2 | 2.45 |
| 2.45 | 0.45 | 2.35 | 2 | 2.5 |
| 2.5 | 0.5 | 2.85 | 3 | 2.55 |
| 2.55 | −0.45 | 2.4 | 2 | 2.6 |
| 2.6 | 0.6 | 3 | 3 | 2.65 |
| 2.65 | −0.35 | 2.65 | 3 | 2.7 |
| 2.7 | −0.3 | 2.35 | 2 | 2.7 |
| 2.75 | 0.75 | 3.1 | 3 | 2.75 |
| 2.8 | −0.2 | 2.9 | 3 | 2.85 |
| 2.85 | −0.15 | 2.75 | 3 | 2.85 |
| 2.9 | −0.1 | 2.65 | 3 | 2.9 |
| 2.95 | −0.05 | 2.6 | 3 | 3 |
| 3 | 0 | 2.6 | 3 | 3 |
| 3.05 | 0.05 | 2.85 | 3 | 3.1 |
| 3.1 | 0.1 | 2.75 | 3 | 3.15 |
| 3.15 | 0.15 | 2.9 | 3 | 3.15 |
| 3.2 | 0.2 | 3.1 | 3 | 3.25 |
| 3.25 | 0.25 | 3.35 | 3 | 3.3 |
| 3.3 | 0.3 | 3.65 | 4 | 3.3 |
| 3.35 | −0.65 | 3 | 3 | 3.35 |
| 3.4 | 0.4 | 3.4 | 3 | 3.4 |
| 3.45 | 0 | 3.85 | 4 | 3.45 |
| 3.5 | −0.5 | 3.35 | 3 | 3.5 |
| 3.55 | 0.55 | 3.9 | 4 | 3.55 |
| 3.6 | −0.4 | 3.5 | 4 | 3.6 |
| 3.65 | −0.35 | 3.15 | 3 | 3.65 |
| 3.7 | 0.7 | 3.85 | 4 | 3.75 |
| 3.75 | −0.25 | 3.6 | 4 | 3.8 |
| 3.8 | −0.2 | 3.4 | 3 | 3.8 |
| 3.85 | 0.85 | 4.25 | 4 | 3.9 |
| 3.9 | −0.1 | 4.15 | 4 | 3.95 |
| 3.95 | −0.05 | 4.1 | 4 | 3.95 |
| 4 | 0 | 4.1 | 4 | 4.05 |
| 4.05 | 0.05 | 4.15 | 4 | 4.05 |
| 4.1 | 0.1 | 4.25 | 4 | 4.1 |
| 4.15 | 0.15 | 4.4 | 4 | 4.2 |
| 4.2 | 0.2 | 4.6 | 5 | 4.2 |
| 4.25 | −0.75 | 3.85 | 4 | 4.25 |
| 4.3 | 0.3 | 4.15 | 4 | 4.35 |
| 4.35 | 0.35 | 4.5 | 5 | 4.4 |
| 4.4 | −0.6 | 3.9 | 4 | 4.45 |
| 4.45 | 0.45 | 4.35 | 4 | 4.5 |
| 4.5 | 0.5 | 4.85 | 5 | 4.55 |
| 4.55 | −0.45 | 4.4 | 4 | |
| 4.6 | 0.6 | 5 | 5 | |
| 4.65 | −0.35 | 4.65 | 5 | |
| 4.7 | −0.3 | 4.35 | 4 | |
| 4.75 | 0.75 | 5.1 | 5 | |
| 4.8 | −0.2 | 4.9 | 5 | |
| 4.85 | −0.15 | 4.75 | 5 | |
| 4.9 | −0.1 | 4.65 | 5 | |
| 4.95 | −0.05 | 4.6 | 5 | |
| 5 | 0 | 4.6 | 5 | |

It is seen that the voltage on line D moves up and down along curve 52 of FIG. 3 and the signal fed to the output device 45 varies up and down particularly around the change over points. When differentiated and used with a stepper motor, the result is that the stepper motor tries to go back and forth as the voltage input varies but because it does not act that fast and because of the gearing and linkages, connected thereto all of which act as a low pass filter, it will more closely follow the average of the input changes which, as seen in the chart above, turns out to be a nearly identical to the ramp 50. It will be noted that average values, such as voltages 52, differ only slightly from the values on ramp 50.

The same operation would occur if the input from computer 30 were like the sine curve 10 of FIG. 1, or any other curve output from computer 30. More particularly, with the circuit of FIG. 2, regardless of the input curve shape, the average of the voltages at point D will very closely follow the input curve shape. Thus any output device will very closely follow the high-resolution input signal even though it is a low-resolution device.

The low frequency noise that exists in the present state of the art is now shifted to higher frequencies that most systems will tend to filter out. This results in an accurate representation of the input signal all the way down to DC to a fraction of a step of the output device.

It is therefore seen that I have provided a system that can obtain a high fidelity output even though the output device has limited resolution. Many changes and additions will occur to those having ordinary skill in the art. For example, uses with low-resolution devices other than stepper motors are contemplated, such as an analog to digital converter. Accordingly, I do not wish to be limited to the specific apparatus and methods used in describing the preferred embodiment of the present invention.

What is claimed is:

1. Apparatus for use with a high resolution input for producing a high fidelity output for a limited resolution device, comprising:

means connected to receive the high-resolution input and a second input, and operable to produce a resultant output indicative of the difference between the high resolution input and the second input;

means connected to receive the resultant output and produce an integrated output representative of an integration of the resultant output;

means connected to receive the integrated output and to produce a limited output of a value consistent with the limited resolution device; and means connecting the limited output to the second input, the average value of the limited output having a magnitude substantially equal to the high resolution input.

2. Apparatus according to claim 1 wherein the high-resolution input is produced by a computer.

3. Apparatus according to claim 1 wherein the means connected to receive the high-resolution input is a difference circuit.

4. Apparatus according to claim 1 wherein the means connected to receive the resultant output is an integrator.

5. Apparatus according to claim 1 wherein the means connected to receive the integrated output is a comparator that compares the integrated output with predetermined values to produce the limited output as a series of steps to operate the limited resolution device.

6. Apparatus according to claim 5 wherein the limited resolution device is a stepper motor.

7. Apparatus for use with a high resolution input for producing a high fidelity output for a limited resolution device, comprising:

a difference circuit having a first input connected to receive the high resolution input and a second input, and operable to produce a resultant output indicative of the difference between the first and second inputs, an integrator connected to receive the resultant output and produce an integrated output representative of an integration of the resultant output;

a comparator connected to receive the integrated output and to produce a limited output of a value consistent with the limited resolution device; and means connecting the limited output to the second input of the difference circuit, the average value of the limited output having a magnitude substantially equal to the high resolution input.

8. Apparatus according to claim 7 wherein the comparator compares the integrated output with predetermined values to produce the limited output as a series of steps to operate the limited resolution device.

9. The method of converting a high resolution input to produce a high fidelity output for a limited resolution device, comprising the steps of:

taking the difference between the high fidelity output and a limited output to produce a difference output;

integrating the difference output to produce an integrated output; and comparing the integrated output with predetermined values consistent with the limited resolution device to produce the limited output, the average of the limited output constituting the high fidelity output.

10. The method of claim 9 further comprising the step of:

connecting the limited output to supply the input for the limited resolution device.

* * * * *